3,248,280
CELLULOSIC AND WOOL MATERIALS CONTAINING A REACTION PRODUCT OF EPICHLOROHYDRIN AND A POLYAMIDE DERIVED FROM POLYALKYLENE POLYAMINE WITH A MIXTURE OF POLYMERIC FATTY ACID AND DIBASIC CARBOXYLIC ACID
James W. Hyland, Jr., Maumee, Ohio, assignor to Owens-Illinois Inc., a corporation of Ohio
No Drawing. Filed July 29, 1963, Ser. No. 298,464
9 Claims. (Cl. 162—164)

The present invention relates to novel products and to the process of producing the same. Particularly, it relates to the manufacture of resin-treated organically derived materials, including wool and cellulosic materials such as cotton fabrics and paper.

It is known that uncured thermosetting cationic resins comprising a water-soluble polymeric reaction product of epichlorohydrin and a polyamide derived from a polyalkylene polyamine and a saturated aliphatic dibasic carboxylic acid containing 3 to 10 carbon atoms can be applied to fibrous cellulosic materials such as paper pulp so as to impart wet strength thereto (see U.S. Patent No. 2,926,154). Moreover, it is also known that the sizing or water proofing properties of paper can be greatly improved by employing beater additives in the manufacture of paper consisting of certain polyamide resin suspensoids which are prepared as a dispersion in an acidic aqueous medium of a polyamide derived from polymeric fat acids and polyamines having at least 3 atoms intervening between the amine groups principally involved in the amidification reaction, the polyamide having an amine number of at least 50.

It has now been discovered that a polyamide-epichlorohydrin resin made with the polyamide derived from a polyamine and a mixture of (a) certain discarboxylic acids and (b) polymeric fat acids produces an unexpected and unpredictable synergism.. Thus, the resulting resin is characterized by having superior sizing and water hold-out properties than the polyamide resin suspensoids referred to above.

It is therefore an object of this invention to provide novel products which have incorporated therein polyamide-epichlorohydrin resins and which are characterized by having improved sizing properties in the case of cellulosic materials such as paper and cotton fabrics and improved water hold-out properties in the case of wool fabrics.

It is another object of this invention to provide novel paper products which have incorporated therein polyamide-epichlorohydrin resins and which are characterized by having improved wet strength and sizing properties.

It is another object of the present invention to provide a novel process of producing such cellulosic and wool products.

A still further object of this invention is to provide a more economical process for making paper products characterized by having excellent wet strength and waterproofing or sizing properties.

These and other objects will be apparent from the description which follows.

In accordance with the invention, the above and other objects are accomplished by applying to wool and cellulosic materials, such as paper pulp, and uncured thermosetting cationic resin comprising a water-soluble polymeric reaction product of epichlorohydrin and a polyamide derived from a polyalkylene polyamine and a mixture of (a) a saturated aliphatic dibasic carboxylic acid containing from about 3 to about 10 carbon atoms and (b) a polymeric fat acid. It has been found that resins of this type impart excellent wet strength and sizing or waterproofing properties to a cellulosic material such as paper, and improved water hold-out properties to wool fabrics.

The dicarboxylic acids contemplated for use in preparing the resins of the invention are the saturated aliphatic dibasic carboxylic acids containing from 3 to 10 carbon atoms such as succinic, adipic, azelaic and the like, with saturated dibasic acids having from 4 to 8 carbon atoms in the molecule being preferred. Blends of two or more of the saturated dibasic carboxylic acids may also be used.

A variety of polyalkylene polyamines may be employed, of which the polyethylene polyamines represent an economically preferred class. More specifically, the polyalkylene polyamines contemplated for use may be represented as polyamines in which the nitrogen atoms are linked together by groups of the formula $—C_nH_{2n}—$ where $n$ is a small integer greater than unity and the number of such groups in the molecule ranges from two up to about eight. The nitrogen atoms may be attached to adjacent carbon atoms in the group $—C_nH_{2n}—$ or to carbon atoms further apart, but not to the same carbon atom. This invention contemplates not only the use of such polyamines as diethylenetriamine, triethylenetetramine, tetraethylenepentamine and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water excess ammonia, and ethylenediamine is a very satisfactory starting material. The term "polyalkylene polyamine" employed in the claims, therefore, refers to and includes any of the polyalkylene polyamines referred to above or to a mixture of such polyalkylene polyamines.

The polymeric fat acids employed can be those resulting from the polymerization of drying or semi-drying oils, or the free acids or simple aliphatic alcohol esters thereof. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fat acids, the fatty acids with sufficient double bond functionality combine, for the most part, probably by a Diels-Alder mechanism, to provide a mixture of dibasic and higher polymeric acids. The acids with insufficient functionality to react remain as monomers and may be removed by distillation. The residue after distillation consists of the desired polymeric acids, and this mixture is used for the preparation of the polyamide resin. In place of this method of polymerization, any other method of polymerization may be employed, whether the resultant polymer possesses residual unsaturation or not. The term "polymeric fat acid" as used herein is intended to include the polymerized mixture of acids obtained, which mixture usually contains a predominant proportion of dimeric acids, a smaller quantity of trimeric and higher polymeric acids, and some residual monomer.

The temperatures necessary for carrying out the reaction between the polyalkylene polyamine and the mixture of dibasic and fat acids can vary from about 60° C. to about 200° C. The time of reaction will depend on the temperatures utilized and will ordinarily vary from about 1 to 2 hours. The resulting polyamide is thereafter reacted with epichlorohydrin at a temperature from about 30° C. to about 90° C. and preferably between 30° C. to 80° C. Time of the reaction will depend on the temperature and will vary from about 1 to 1½ hours.

The foregoing reaction is general in nature and the following specific examples are given as illustrative thereof.

EXAMPLE I

The polyamide-epichlorohydrin resin of the present invention was prepared from the following reactants:

|  | Mols | Weight, grams |
|---|---|---|
| Empol 1022 dimer acid | .05 | 30.0 |
| Stearic acid | .026 | 7.5 |
| Adipic acid | .20 | 29.2 |
| Diethylene triamine | .272 | 28.2 |

From the above table it will be apparent that the Empol 1022 dimer acid (.05 mol) and adipic acid (.20 mol) are in the molar ratio of about 1 to 4.

The triamine was heated to 60° C. and the dimer acid was added slowly thereto resulting in an exothermic reaction and the temperature rising to 137° C. The adipic acid and then the stearic acid were added with the temperature being maintained between 190–200° C. The reaction mixture was then cooled to 170° C. and poured slowly into 100 grams of anhydrous isopropanol. The reaction container was rinsed with 20 grams of isopropanol, added to the main reaction mixture, and set aside to react with the epichlorohydrin. The total reaction time was approximately 95 minutes. Thereafter the above combined reaction product was placed in a 1000 ml. flask and 100 grams of epichlorohydrin added thereto. This reaction mixture was heated with stirring to 60° C. After about one hour during which the reaction temperature did not exceed 80° C., the mixture was cooled to 50° C. and approximately 10 ml. of concentrated HCl added to pH 4.5. Thereafter 100 ml. of warm water was added to give the final product.

EXAMPLE II

A particularly satisfactory resin having good water hold-out and sizing properties in addition to good wet strength was prepared by the method of Example I except that the proportions of material were as follows.

Material: Wt. in grams
- Empol 1022 dimer acid _____ 70.7
- Adipic acid _____ 63.8
- Diethylene triamine _____ 59.3
- Stearic acid _____ 7.1
- Epichlorohydrin _____ 128.5

Pursuant to Bulletin EM–948 issued by Emery Industries, Inc., Empol 1022 dimer acid is a polymerized fatty acid, essentially a $C_{36}$, dibasic acid resulting from dimerization of naturally-occurring $C_{18}$ unsaturated fatty acids. The molecular weight of 1022 is approximately 600. The structure is estimated to be

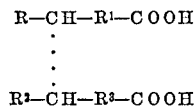

where the linkage (. . . .) between the two molecules is indeterminate. The (a) R and $R^2$ groups and (b) $R^1$ and $R^3$ groups are probably straight-chain alkyl and alkylene groups, respectively, but not necessarily of the same chain length.

During the preparation of the above polyamide-epichlorohydrin resin, some foaming will occur during the formation of the polyamide such that a small amount of an anti-foaming agent may be incorporated in the reaction mix to minimize the same.

In each of the above examples, the use of stearic acid results in the formation of an improved resinous product. Specifically, it has been noted that the stearic acid gives stability to the water dispersion of the resin. Besides stearic acid, any saturated, aliphatic mono-basic acid that is insoluble in water and having at least twelve carbon atoms can be employed, such as, myristic, behenic, cerotic, and palmitic acids, by way of example. In general, about 0.02 to 0.03 mol of the acid can be effectively employed with a preferred range being about 0.25 to 0.27 mol.

The process for the preparation of paper containing the polyamide epichlorohydrin resins of the present invention follows conventional procedures well known in the art. For example, the resin is added to the pulp, after which the pulp is well agitated, and the sheet then formed and dried in the usual manner thereby curing the resin to its polymerized and water-insoluble condition whereby wet strentgh and excellent sizing are imparted to the paper. In general, from 0.25 to 4.0% of the resin based on the dry weight of the pulp is preferred although larger amounts of the resin can be employed.

A comparison of papers incorporating the polyamide-epichorohydrin resin of the present invention and a polyamide-epichlorohydrin resin wherein the polyamide is derived from a polyamine and a dibasic carboxylic acid shows that superior results are obtained with the resin of the present invention as indicated by Table I.

*Table I*

COMPARISON OF KYMENE 557 [1] (A) AND POLYAMIDE-EPICHLOROHYDRIN RESIN (B) OF PRESENT INVENTION

| Pulp Sample | Resin | Percent Resin on Pulp | Percent Resin Retained | C.W.P., min. | F.I.P., sec. | Tensile Strength | | | Resin Efficiency [2] |
|---|---|---|---|---|---|---|---|---|---|
| | | | | | | Dry | Wet | Percent W/D | |
| 1 | A | 2.0 |  | 20 | 10 |  |  |  |  |
| 2 | A | 4.0 | 2.80 | 20 | 10 | 38.6 | 14.7 | 39.3 | 13.7 |
| 3 | B | 2.0 | 1.22 | 60+ | 600+ | 27.8 | 10.4 | 37.4 | 30.6 |
| 4 | B | 4.0 | 2.80 | 60+ | 600+ | 29.7 | 12.3 | 41.4 | 14.8 |
| 5 | Blank | 0 | 0 | 8 | 8 | 30.3 | 1.8 | 5.9 |  |
| 6 | A | 0.5 | 0.37 |  |  | 54.7 | 12.8 | 23.4 | 63.2 |
| 7 | A | 1.0 | 1.00 |  |  | 62.4 | 20.8 | 33.3 | 33.3 |
| 8 | A | 2.0 | 1.96 | 3 sec. | <1 | 51.4 | 19.8 | 38.5 | 19.6 |
| 9 | A | 4.0 | 2.80 | 2 sec. | <1 | 56.8 | 23.4 | 41.2 | 14.7 |
| 10 | B | 0.5 | 0.23 |  |  | 63.4 | 16.7 | 26.4 | 115.0 |
| 11 | B | 1.0 | 0.51 |  |  | 55.7 | 19.7 | 35.4 | 69.3 |
| 12 | B | 2.0 | 1.26 | 60+ | 600+ | 48.5 | 17.8 | 37.0 | 29.4 |
| 13 | B | 4.0 | 1.80 | 60+ | 600+ | 49.1 | 20.2 | 41.2 | 22.8 |
| 14 | Blank | 0 | 0 | 2 | 2 | 47.1 | 2.0 | 4.3 |  |

[1] Resin made from adipic acid and tetraethylenepentamine further reacted with epichlorohydrin.

[2] Resin Efficiency = $\dfrac{\text{Percent Wet/Dry Tensile Strength}}{\text{Percent Retained Resin}}$

Table II

COMPARISON OF VERSAMID 100 [1] (C) AND POLYAMIDE-EPICHLOROHYDRIN RESIN (D) OF THE PRESENT INVENTION

| Pulp Sample | Resin | Percent Resin on pulp | Cure Time, min. | C.W.P., min. | F.I.P., sec. | Tensile Strength | | |
|---|---|---|---|---|---|---|---|---|
| | | | | | | Dry | Wet | Percent W/D |
| 15 | C | 3.0 | 5 | 7.3 | 21.5 | 16.6 | 3.7 | 22.3 |
| 16 | C | 5.0 | 5 | 6.3 | 29 | 16.2 | 3.6 | 22.2 |
| 17 | D | 2.0 | | 60+ | 600+ | 27.8 | 10.4 | 37.4 |
| 18 | D | 4.0 | | 60+ | 600+ | 29.7 | 12.3 | 41.4 |
| 19 | Blank | 0 | 5 | 1 | 4 | 29.9 | 0.6 | 2.0 |

[1] Resin made from carboxylic fatty acid and tetraethylenepentamine.

From the column heading identified as Resin Efficiency in Table I, it will be apparent that the novel resins of this invention are more economical since lesser amounts of the resin are required to produce the superior results obtained (see Percent Resin Retained column of Table I).

In the above tables, C.W.P. has reference to a cold water penetration (C.W.P.) test which consists of placing a 4 inch square of paper on the surface of distilled water at 73° F. in such a manner that water does not run over the upper surface of the paper. The time required for water to penetrate from the lower surface to the upper surface of the paper is the measure of its absorbency or water repellency. The time is the visual observation of the wetting or darkening of 98% of the upper surface.

Similarly, F.I.P. has reference to a feather ink penetration (F.I.P.) which is like the C.W.P. test except that a 1½" square of sample is placed on the surface of an ink solution. A visual observation is made of the time required to wet 50% of the upper surface of the paper sample, with the ink at 73° F. The formula for the feather ink is as follows:

9 grams Soluble Blue 2B extra—National Aniline,
10.2 cc. conc. HCl,
Dilute with distilled water, 73° F. to 1425 ml.,
Then add 476 ml. of 85% lactic acid.

The process and resin of the present invention are also effective in imparting water hold-out properties to wool fabrics as evidenced by the following.

Sample swatches of wool were dipped into a 1% solution of the resin in water, using a tub-sizing process. When saturated, the swatches were immediately removed from the solution and squeezed to remove excess. The swatches were then dried on a steam-heated platen, whereupon the resin gelled and cured.

Water resistance was then demonstrated by placing a drop of water on the sample or by placing swatches on the surface of water in a pan. Untreated control swatches absorbed water instantaneously. The resin treated samples absorbed water very slowly. In the drop test, a drop of water was placed on the cloth surface and absorption time was measured. The drop on treated wool, for example, showed a very high contact angle, indicative of water repellency. The swatches were next washed in hot soapy water for 20 minutes, rinsed, and dried. Tests again indicated the same degree of water repellency, showing that the resin was not removed by such washing as evidenced by the following table.

Table III

WATER DROP TEST ON WOOL SWATCH

| | Absorbency Before Washing | Absorbency After Washing |
|---|---|---|
| Control Swatch _____ seconds | 45–57 | 29–33 |
| Resin Treated Swatch _____ minutes | 10 | 9 |

In general, from .25 to 4.0% of the resin based on the dry weight of the wool is preferred although larger amounts of the resin can be employed.

It should be noted that no novelty is claimed for a polyamide prepared from an alkylene diamine and a fat acid which is described fully in U.S. Patent No. 2,767,089 to Renfrew et al. Moreover, no novelty is alleged for polyamide-epichlorohydrin resins wherein the polyamide is prepared from an alkylene diamine and selected aliphatic dicarboxylic acids which is described fully in U.S. Patent No. 2,962,154 to Keim. However, it is maintained that applicant's use of a mixture of these acids with an alkylene diamine to form a polyamide which is subsequently reacted with epichlorohydrin is inventive since it results in the formation of polyamide-epichlorohydrin resins having properties which excel either of the resins used individually as disclosed in U.S. patents referred to above. The results obtained by the applicant are not only unexpected but are indicative of a synergistic effect being produced. As a result, lesser amounts of applicant's resin can be employed thereby effecting economies in coating materials for the purposes of improving their wet strength and sizing (or water-proofing) properties in the case of cellulosic materials such as cotton fabrics and paper; and water hold-out properties in the case of wool fabrics.

Various modifications of the invention dislcosed herein will be evident to those skilled in the art. Thus, the novel resins of the present invention can be applied to preformed and partially or completely dried paper by immersion or spraying instead of being added to the paper pulp. As a result, it will be seen that the present invention permits the preparation of paper characterized by having excellent strength and sizing properties by internal addition or by surface application.

While preferred embodiments of the invention have been exemplified and described herein, the invention is not to be construed as limited thereby.

What I claim is:

1. An organically derived material selected from the group consisting of cellulosic materials and wool containing from about 0.25 to 4% based on its dry weight of a resin, said resin comprising a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4.

2. A cellulosic material having improved wet strength and sizing properties and containing from about 0.25 to 4% based on its dry weight of a resin, said resin comprising a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4.

3. A paper product having improved wet strength and sizing properties comprising sheeted cellulosic fibers containing from about 0.25 to 4% based on its dry weight of a resin, said resin comprising (1) a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4 and (2) a saturated aliphatic monobasic acid having at least 12 carbon atoms as a stabilizing agent.

4. A product in accordance with claim 3 in which the dibasic carboxylic acid is a $C_4$–$C_8$ saturated aliphatic dibasic carboxylic acid.

5. The product of claim 3 wherein the saturated acid is stearic acid.

6. A process for the production of a paper product having improved wet strength and sizing properties which comprises incorporating in said paper product from about 0.25 to 4% based on its dry weight of a resin, said resin comprising a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4.

7. A process for the production of a paper product having improved wet strength and sizing properties which comprises incorporating in said paper product a resin, said resin comprising a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4 for about 1 to 2 hours, and heat curing said paper product and resin.

8. A process according to claim 7 in which the polyamine employed for the preparation of the polyamide is diethylene triamine.

9. A wool fabric having improved water hold-out properties and containing from about 0.25 to 4% based on its dry weight of a resin, said resin comprising a reaction product of epichlorohydrin and a polyamide obtained by heating together at about 60–200° C. a polyalkylene polyamine and a mixture of (a) a polymeric fat acid and (b) a saturated aliphatic dibasic carboxylic acid containing from 3 to 10 carbon atoms and wherein the polymeric fat acid and the dibasic acid are in the molar ratio of about 1 to 4.

References Cited by the Examiner

UNITED STATES PATENTS

| | | | |
|---|---|---|---|
| 2,595,935 | 5/1952 | Daniel et al. | 162—164 |
| 2,785,092 | 3/1957 | Hiestand et al. | 117—139.5 |
| 2,811,495 | 10/1957 | Wittcoff et al. | 260—18 |
| 2,840,264 | 6/1958 | Groves | 260—18 |
| 2,882,185 | 4/1959 | Valko et al. | 260—18 |
| 2,926,116 | 2/1960 | Keim | 162—164 |
| 3,001,960 | 9/1961 | Hovey | 260—18 |

FOREIGN PATENTS 711,404    6/1954    Great Britain.

DONALL H. SYLVESTER, *Primary Examiner.*

MORRIS O. WOLK, *Examiner.*